(12) United States Patent
Lortie

(10) Patent No.: US 12,025,634 B2
(45) Date of Patent: Jul. 2, 2024

(54) STROBOSCOPIC VIDEO TO ROTATIONS PER TIME CONVERSION

(71) Applicant: ContiTech Antriebssysteme GmbH, Hannover (DE)

(72) Inventor: Michel Lortie, Quebec (CA)

(73) Assignee: ContiTech Antriebssysteme GmbH, Hannover (DE)

( * ) Notice: Subject to any disclaimer, the term of this patent is extended or adjusted under 35 U.S.C. 154(b) by 383 days.

(21) Appl. No.: 17/304,384

(22) Filed: Jun. 21, 2021

(65) Prior Publication Data

US 2022/0404384 A1 Dec. 22, 2022

(51) Int. Cl.
| | |
|---|---|
| G01P 3/40 | (2006.01) |
| B65G 23/24 | (2006.01) |
| B65G 43/04 | (2006.01) |
| G01F 13/00 | (2006.01) |
| G01K 13/00 | (2021.01) |
| G05B 23/02 | (2006.01) |

(52) U.S. Cl.
CPC ............ G01P 3/40 (2013.01); B65G 43/04 (2013.01); G01F 13/003 (2013.01); G01K 13/00 (2013.01); G05B 23/0283 (2013.01); B65G 23/24 (2013.01); *B65G 2203/0291* (2013.01)

(58) Field of Classification Search
None
See application file for complete search history.

(56) References Cited

U.S. PATENT DOCUMENTS

| | | |
|---|---|---|
| 4,860,096 A | 8/1989 | Long et al. |
| 6,793,397 B2 | 9/2004 | Ishiguro et al. |
| 7,046,160 B2 | 5/2006 | Pederson et al. |
| 7,446,962 B2 | 11/2008 | Matsumoto et al. |
| 8,272,982 B2 | 9/2012 | Fitz |
| 9,154,743 B2 | 10/2015 | Hatcher, Jr. et al. |

(Continued)

FOREIGN PATENT DOCUMENTS

| | | |
|---|---|---|
| DE | 4240167 A1 | 12/1993 |
| EP | 0279794 A1 | 8/1988 |

OTHER PUBLICATIONS

International Search Report dated Sep. 20, 2022 of International Application PCT/EP2022/066915 claiming priority this application.

(Continued)

*Primary Examiner* — Mark T Monk
(74) *Attorney, Agent, or Firm* — Gregory J. Adams; Richard A. Wolf

(57) ABSTRACT

A rotational speed measurement system includes a video device configured to obtain a video of a pulley of a conveyor belt system. The rotational speed measurement system also includes a strobe configured to generate a stroboscopic effect on the obtained video. The rotational speed measurement system also includes a memory device. The rotational speed measurement system also includes a network interface. The rotational speed measurement system also includes one or more processors configured to: generate a stroboscopic window using the strobe and the obtained video, synchronize the strobe with the obtained video using the stroboscopic window, determine a measured rotational speed for the pulley based on the synchronized strobe, and determine belt slippage based on the measured rotational speed.

15 Claims, 2 Drawing Sheets

1 Use Camera Or Video
2 Synchronize Stroboscopic Window
3 Perform RPM Adjustments To Obtain Synchronization
4 Determine Measured RPM

(56) References Cited

U.S. PATENT DOCUMENTS

| | | |
|---|---|---|
| 9,334,122 B2 | 5/2016 | Shoji et al. |
| 9,338,365 B2 | 5/2016 | Ohwa et al. |
| 10,192,124 B2 | 1/2019 | Yamamura |
| 2011/0005904 A1 | 1/2011 | Ricciardi, Sr. et al. |
| 2014/0201571 A1* | 7/2014 | Hosek .................... B25J 9/1674 |
| | | 714/26 |
| 2016/0076442 A1 | 3/2016 | Spohn et al. |
| 2017/0024939 A1 | 1/2017 | Wonderlich |

OTHER PUBLICATIONS

Fernando J.T.E. Ferreira and Fernando J.P. Lopes, 2016—Webcam-Based Tachometer for In-Field Induction Motor Load Estimation—XXII International Conference ono Electrical Machines (ICEM), XP032989675, DOI: 10.1109/ICELMACH.2016.7732854, XXIII International Conference on Electrical Machines (ICEM); IEEE, pp. 2380-2388. Published Sep. 4, 2016.

\* cited by examiner

STROBOSCOPIC VIDEO TO ROTATIONS PER TIME CONVERSION

FIELD

The disclosure generally relates to systems and methods for analyzing and determining rotations per time for various applications, including conveyor belt pulley or drum rotation.

BACKGROUND

Conveyor belts are devices commonly used to transport material or articles from one location to another. Conveyor belts are used in mining applications, assembly lines and the like.

Conveyor belts are one component of a conveyor belt system. The system also includes two or more pulleys/drums where the conveyor belt wraps around the pulleys. The conveyor belt rotates about the pulleys. At least one of the pulleys is powered, also referred to as a drive pulley, and causes the conveyor belt to move and rotate about the pulleys.

As the conveyor belt moves, it conveys or carries a medium from one location to another.

Typically, the conveyor belt moves at a speed directly related to the rotation of the drive pulley. However, damage to the belt and/or the pulleys can occur for a variety of reasons. Thus, variations from the expected speed of the conveyor belt and the actual rotational speed of the pulleys can indicate damage of some type.

Techniques to measure the rotational speed of the pulleys typically involves removing components of the conveyor belt system and performing physical measurements. These techniques can be dangerous to perform and result in costly down time.

What is needed are techniques to measure rotational speed of pulleys and the like.

DETAILED DESCRIPTION

Figure 1:
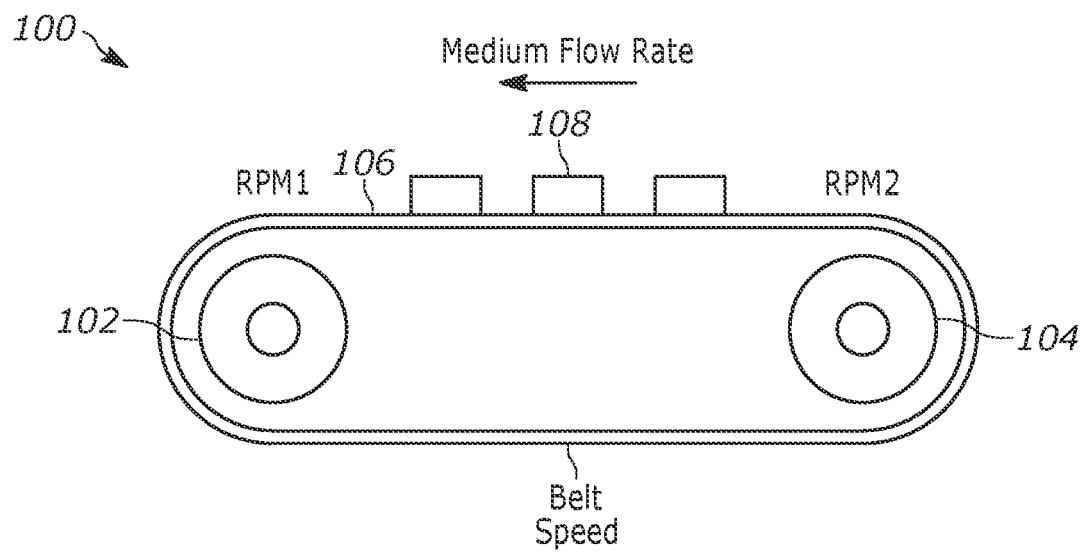
FIG. 1 is a diagram illustrating a conveyor belt system 100 in accordance with one or more embodiments.

The following description of the variations is merely illustrative in nature and is in no way intended to limit the scope of the disclosure, its application, or uses. The description is presented herein solely for the purpose of illustrating the various embodiments of the disclosure and should not be construed as a limitation to the scope and applicability of the disclosure. In the summary of the disclosure and this detailed description, each numerical value should be read once as modified by the term "about" (unless already expressly so modified), and then read again as not so modified unless otherwise indicated in context. Also, in the summary of the disclosure and this detailed description, it should be understood that a value range listed or described as being useful, suitable, or the like, is intended that any and every value within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors had possession of the entire range and all points within the range.

Unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of concepts according to the disclosure. This description should be read to include one or at least one and the singular also includes the plural unless otherwise stated.

The terminology and phraseology used herein is for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited.

Also, as used herein any references to "one embodiment" or "an embodiment" means that a particular element, feature, structure, or characteristic described in connection with the embodiment is included in at least one embodiment. The appearances of the phrase "in one embodiment" in various places in the specification are not necessarily referring to the same embodiment.

The foregoing description of the embodiments has been provided for purposes of illustration and description. Example embodiments are provided so that this disclosure will be sufficiently thorough, and will convey the scope to those who are skilled in the art. Numerous specific details are set forth such as examples of specific components, devices, and methods, to provide a thorough understanding of embodiments of the disclosure, but are not intended to be exhaustive or to limit the disclosure. It will be appreciated that it is within the scope of the disclosure that individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Also, in some example embodiments, well-known processes, well-known device structures, and well-known technologies are not described in detail. Further, it will be readily apparent to those of skill in the art that in the design, manufacture, and operation of apparatus to achieve that described in the disclosure, variations in apparatus design, construction, condition, erosion of components, gaps between components may present, for example.

Examples can include subject matter such as a method, means for performing acts or blocks of the method, at least one machine-readable medium including instructions that, when performed by a machine cause the machine to perform acts of the method or of an apparatus or system for concurrent communication using multiple communication technologies according to embodiments and examples described herein.

A conveyor belt system includes two or more pulleys/drums where the conveyor belt wraps around the pulleys and a conveyor belt. The conveyor belt rotates about the pulleys. At least one of the pulleys is powered, also referred to as a drive pulley, and causes the conveyor belt to move and rotate about the pulleys.

As the conveyor belt moves, it conveys or carries a medium from one location to another.

Typically, the conveyor belt moves at a speed directly related to the rotation of the drive pulley. However, damage to the belt and/or the pulleys can occur for a variety of reasons. Thus, variations from the expected speed of the conveyor belt and the actual rotational speed of the pulleys can indicate damage of some type.

Techniques to measure the rotational speed of the pulleys typically involves removing components of the conveyor belt system and performing physical measurements. These techniques can be dangerous to perform and result in costly down time.

One or more embodiments are included that use stroboscopic techniques to measure rotational speed without disassembling conveyor belt systems.

FIG. 1 is a diagram illustrating a conveyor belt system 100 in accordance with one or more embodiments. It is appreciated that the system 100 is provided for illustrative purposes and that suitable variations are contemplated.

The system 100 includes a first pulley 102, a second pulley 104 and a conveyor belt 106 that wraps around the pulleys 102 and 104. The first pulley/drum 102 and/or the second pulley/drum 104 can be drive pulleys and cause motion of the conveyor belt 106. Although not show, the system can also comprise a gear box coupled to the pulley(s) and a drive motor coupled to the gear box, the gear box configured to cause the pulley to rotate.

The first pulley 102 rotates in a direction and has a first rotational speed, shown as rotations per minute (RPM) (RPM1) in this example. The second pulley 104 rotates in the direction and has a second rotational speed, (RPM2).

The belt 106 also rotates in the direction about the pulleys 102 and 104. The belt 106 has an associated belt speed and direction. The belt 106 can comprise one or more layers, such as a top cover layer, a carcass and a bottom layer. The belt 106 can comprise an elastomeric material or rubber and can further include longitudinally and/or transverse reinforcements. The reinforcements can include steel, fiber, polyamide and the like.

The belt 106 conveys a medium 108 from one location to another. The medium 108 has a medium flow rate. The medium 108 can be a material, liquid and the like. The medium 108 can include one or more of baggage, boxes, grain, ore, coal, and sand. Ore generally comprises one or more minerals.

The RPM1, RPM2, belt speed, medium flow rate and the like are used to determine belt characteristics including, but not limited to, slippage, remaining life, temperature, and the like.

A stroboscopic effect is a visual phenomenon caused by aliasing that occurs when continuous rotational or other cyclic motion is represented by a series of short or instantaneous samples at a sampling rate close to the period of the motion. It accounts for the "wagon-wheel effect", so-called because in video, spoked wheels (such as on horse-drawn wagons) sometimes appear to be turning backwards.

One or more stroboscopic techniques are utilized to determine the rotational speeds of the pulleys 102 and 104. These techniques involve synchronizing a stroboscopic window with video of the system to facilitate determination of the rotational speeds.

Figure 2:
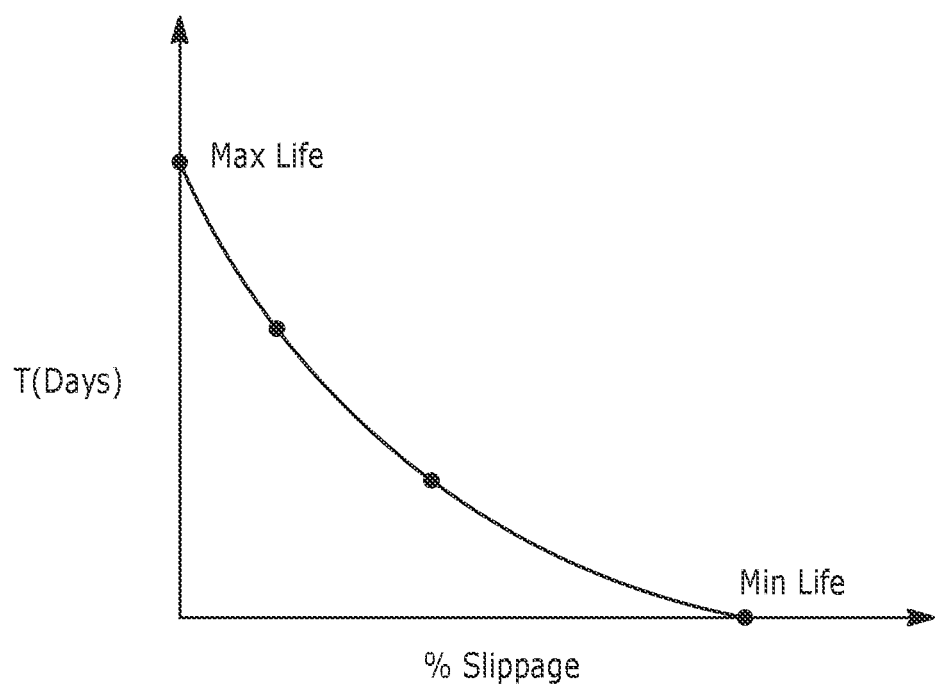
FIG. 2 is a graph depicting remaining life and slippage for the conveyor belt system 100 in accordance with one or more embodiments.

FIG. 2 is a graph depicting remaining life and slippage for the conveyor belt system 100 in accordance with one or more embodiments. It is appreciated that the graph is provided for illustrative purposes and that suitable variations are contemplated.

Slippage is when the belt 106 slips across the pulleys 102,104 and results in a reduced belt speed and can include intermittent stoppage of the belt 106.

The graph depicts slippage percent along an x-axis and remaining life in days along a y-axis. Example data points and a line are shown that describe the relationship between slippage percentage and remaining life.

It can be seen that at zero percent slippage, the belt 106 has a max or first amount of remaining life.

At the other end at 100 percent slippage, the belt 106 has minimum or no remaining life.

It is appreciated that the minimum remaining life can be at less than 100 percent slippage.

Figure 3:
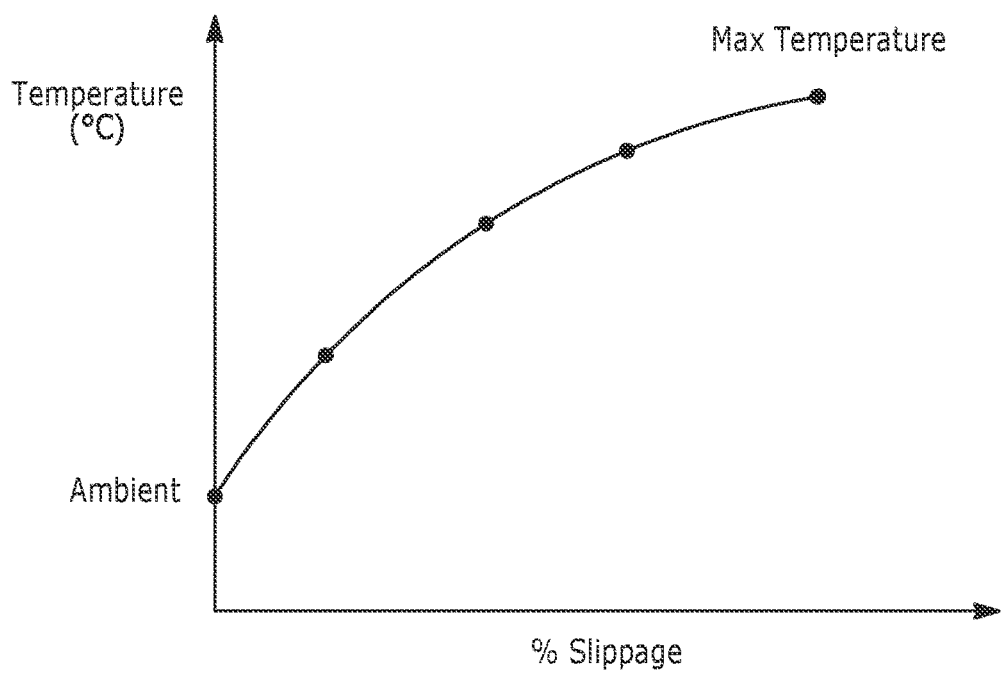
FIG. 3 is a graph depicting temperature and slippage for the conveyor belt system 100 in accordance with one or more embodiments.

FIG. 3 is a graph depicting temperature and slippage for the conveyor belt system 100 in accordance with one or more embodiments. It is appreciated that the graph is provided for illustrative purposes and that suitable variations are contemplated.

The temperature is of the belt 106. When slippage occurs, friction between the belt and the pulleys 102,104 increases. The friction increases the belt temperature.

Example data points and a line are shown that describe the relationship between belt temperature and remaining life.

It can be seen that at zero percent slippage, the temperature is at ambient. At the other end at 100 percent slippage, the belt 106 has a higher or max temperature.

Figure 4:
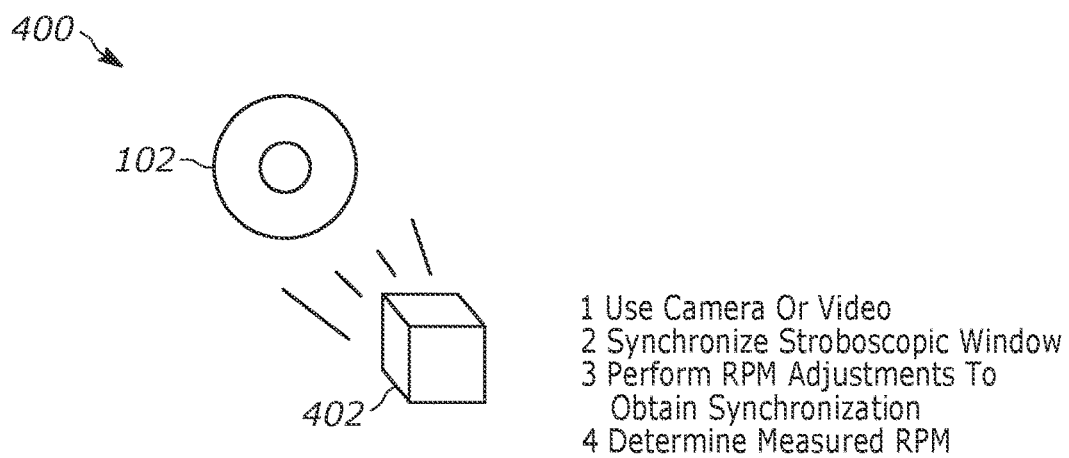
FIG. 4 is a diagram 400 illustrating a pulley rotational speed measurement system 402 for the conveyor belt system 100 in accordance with one or more embodiments.

FIG. 4 is a diagram 400 illustrating a pulley rotational speed measurement system 402 for the conveyor belt system 100 in accordance with one or more embodiments. It is appreciated that the graph is provided for illustrative purposes and that suitable variations are contemplated.

The system 402 is configured to determine a rotational speed of the pulleys 102, 104 of the conveyor belt system 100. Further, the system 402 is configured to determine drive slippage, predict remaining belt life, provide belt ambient temperature appreciation and the like based on the determined rotational speed and one or more of medium flow rate, belt speed, and the like.

To obtain the rotational speed, the system 402 is configured to obtain (1) video of the pulleys 102, 104; such as by using a camera or from a prerecorded library. Then, the system 402 synchronizes the video in a stroboscopic video (2). Rotational speed is adjusted or configured to obtain synchronization (3), such as a still image. The resulting rotational speed when synchronized is the measured rotational speed of the pulleys 102, 104. The system 402 determines (4) the measured rotational speed of the pulleys 102, 104 from the synchronized speed.

In one example, the system 402 is configured to synchronize the video to a rotational speed for (3). In another example, a user interface is provided that permits manual synchronization using a plurality of sliders.

It is appreciated that the system 402 can be configured and utilized to measure rotational speeds of other objects, such as wheels, gears and the like.

Figure 5:
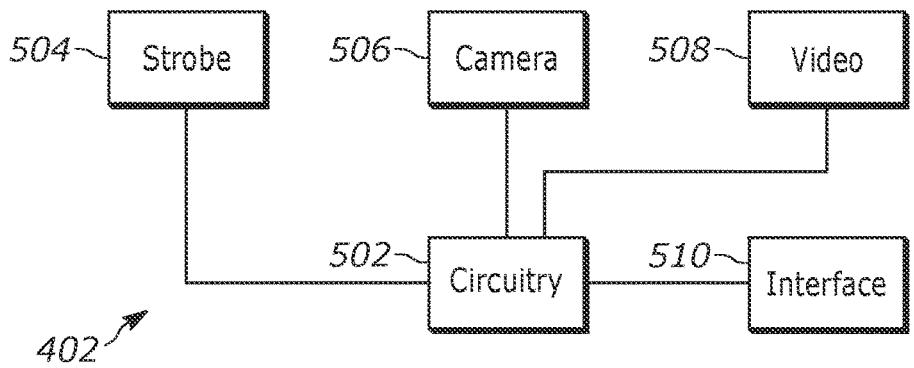
FIG. 5 is a diagram illustrating a pulley rotational speed measurement system 402 for the conveyor belt system 100 in accordance with one or more embodiments.

FIG. 5 is a diagram illustrating a pulley rotational speed measurement system 402 for the conveyor belt system 100 in accordance with one or more embodiments. It is appreciated that the system 402 is provided for illustrative purposes and that suitable variations are contemplated.

The system 402 includes circuitry 502, strobe 504, camera 506, prerecorded video 508, and an interface 510. The circuitry 502 includes one or more processors, a memory, and a network interface. The one or more processors are configured to perform functionality of the system 402. The network interface is configured to provide/receive data to/from a network via a transceiver.

The strobe or stroboscope 504 can comprise a light or visual effect to perform synchronization. Some examples of suitable strobes include a light source supplied with energy from a capacitor, referred to as a charge based strobe. The capacitor is charged to a voltage, such as 300 volts. A trigger transformer triggers a flash. The flash is repeated at a selected frequency.

Generally, if the flash occurs equal to a period of rotation, an object or the pulley appears not to move. A non-integer flash setting can cause the object to appear to move/rotate in one direction or another.

The strobe 504 is configured to generate a flash of increased brightness for a relatively short period of time, such as 200 microseconds, but the period can vary. Thus, the strobe 504 is configurable for flash duration, flash/strobe color, period/frequency and the like.

The strobe 504 can also be virtual, such as an effect added to a video file. The virtual strobe can be adjusted for strobe/flash duration, strobe period or frequency, strobe color, strobe/flash intensity, and the like.

The camera 506 can record and/or provide live video for rotational speed analysis. The prerecorded video 508 can be stored and/or provided from an external source.

The interface 510 can include a display interface, an input interface and the like. In one example, the interface 510 is provided via a cellular/mobile phone screen.

As stated above, the circuitry 502 of the system 402 synchronizes the video in a stroboscopic video (2). Rotational speed (strobe frequency setting) is adjusted or configured to obtain synchronization (3), such as a still image. The resulting rotational speed when synchronized is the measured rotational speed of the pulleys 102, 104. The system 402 determines (4) the measured rotational speed of the pulleys 102, 104 from the synchronized speed.

It is noted that 'having' does not exclude other elements or steps and 'one' or 'one' does not exclude a multitude. It should also be noted that characteristics described with reference to one of the above examples of execution can also be used in combination with other characteristics of other examples of execution described above. Reference signs in the claims are not to be regarded as a restriction.

Various illustrative logics, logical blocks, modules, and circuits described in connection with aspects disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor can be a microprocessor, but, in the alternative, processor can be any conventional processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration. Additionally, at least one processor can comprise one or more modules operable to perform one or more of the steps, blocks and/or actions described herein.

For a software implementation, techniques described herein can be implemented with modules (e.g., procedures, functions, and so on) that perform functions described herein. Software codes can be stored in memory units and executed by processors. Memory unit can be implemented within processor or external to processor, in which case memory unit can be communicatively coupled to processor through various means as is known in the art. Further, at least one processor can include one or more modules operable to perform functions described herein.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product can include a computer readable medium having one or more instructions or codes operable to cause a computer to perform functions described herein.

Communications media embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

Further, the actions of a method or algorithm described in connection with aspects disclosed herein can be embodied directly in hardware, in a software module executed by a processor, or a combination thereof. A software module can reside in RAM memory, flash memory, ROM memory, EPROM memory, EEPROM memory, registers, a hard disk, a removable disk, a CD-ROM, or any other form of storage medium known in the art. An exemplary storage medium can be coupled to processor, such that processor can read information from, and write information to, storage medium. In the alternative, storage medium can be integral to processor. Further, in some aspects, processor and storage medium can reside in an ASIC. Additionally, ASIC can reside in a user terminal. In the alternative, processor and storage medium can reside as discrete components in a user terminal. Additionally, in some aspects, the s and/or actions of a method or algorithm can reside as one or any combination or set of codes and/or instructions on a machine-readable medium and/or computer readable medium, which can be incorporated into a computer program product.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

As it employed in the subject specification, the term "processor" can refer to substantially any computing processing unit or device including, but not limited to including, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor may also be implemented as a combination of computing processing units.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner", "adjacent", "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

It should be added that 'having' does not exclude other elements or steps and 'one' or 'one' does not exclude a multitude. It should also be noted that characteristics described with reference to one of the above examples of execution can also be used in combination with other characteristics of other examples of execution described above. Reference signs in the claims are not to be regarded as a restriction.

Various examples are provided, however it is appreciated that suitable variations are contemplated.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus, system, and the like to perform the actions.

A rotational speed measurement system includes a video device configured to obtain a video of a pulley of a conveyor belt system. The rotational speed measurement system also includes a strobe configured to generate a stroboscopic effect on the obtained video. The rotational speed measurement system also includes a memory device. The rotational speed measurement system also includes a network interface. The rotational speed measurement system also includes one or more processors configured to: generate a stroboscopic window using the strobe and the obtained video, synchronize the strobe with the obtained video using the stroboscopic window, determine a measured rotational speed for the pulley based on the synchronized strobe, and determine belt slippage based on the measured rotational speed.

Implementations may include one or more of the following features. The one or more processors configured to determine a remaining life based on the determined belt slippage. The one or more processors configured to determine a belt temperature based on the determined belt slippage. The one or more processors configured to determine a medium flow rate for the conveyor belt system. The medium may include one or more of baggage, boxes, grain, ore, coal, and sand. The conveyor belt system may include a gear box coupled to the pulley and a drive motor coupled to the gear box, the gear box configured to cause the pulley to rotate. The conveyor belt system may include a belt rotatable around the pulley and a second pulley. The belt may include a top cover layer, an elastomeric carcass and a bottom layer. The one or more processors configured to determine a belt speed of the conveyor belt system. The one or more processors configured to determine belt slippage based on the measured rotational speed and a medium flow rate for the conveyor belt system. The system may include a user interface configured to facilitate synchronizing the strobe, the user interface may include a plurality of sliders each having a different resolution value. The strobe may include one or more light sources configured with a flash duration and strobe period. The strobe being virtually presented with the obtained video as a strobe effect, the strobe effect having a flash duration, intensity, color and period. The period/frequency of the strobe configured to synchronize the pulley to appear as stationary. Implementations of the described techniques may include hardware, a method or process, or computer software on a computer-accessible medium.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. A rotational speed measurement system comprising:
   a video device configured to obtain a video of a pulley of a conveyor belt system;
   a strobe configured to generate a stroboscopic effect on the obtained video;
   a memory device;
   a network interface; and
   one or more processors configured to:
   generate a stroboscopic window using the strobe and the obtained video;
   synchronize the strobe with the obtained video using the stroboscopic window;
   determine a measured rotational speed for the pulley based on the synchronized strobe; and
   determine belt slippage based on the measured rotational speed.

2. The system of claim 1, the one or more processors configured to determine a remaining life based on the determined belt slippage.

3. The system of claim 1, the one or more processors configured to determine a belt temperature based on the determined belt slippage.

4. The system of claim 1, the one or more processors configured to determine a medium flow rate for the conveyor belt system.

5. The system of claim 4, the medium comprising one or more of baggage, boxes, grain, ore, coal, and sand.

6. The system of claim 1, the conveyor belt system comprising a gear box coupled to the pulley and a drive motor coupled to the gear box, the gear box configured to cause the pulley to rotate.

7. The system of claim 1, the conveyor belt system comprising a belt rotatable around the pulley and a second pulley.

8. The system of claim 7, the belt comprising a top cover layer, an elastomeric carcass and a bottom layer.

9. The system of claim 1, the one or more processors configured to deters-nine a belt speed of the conveyor belt system.

10. The system of claim 1, the one or more processors configured to determine belt slippage based on the measured rotational speed and a medium flow rate for the conveyor belt system.

11. The system of claim 1, further comprising a user interface configured to facilitate synchronizing the strobe, the user interface comprising a plurality of sliders each having a different resolution value.

12. The system of claim 1, the strobe comprises one or more light sources configured with a flash duration and strobe period.

13. The system of claim 1, the strobe being virtually presented with the obtained video as a strobe effect, the strobe effect having a flash duration, intensity, color and period.

14. The system of claim 1, a period/frequency of the strobe configured to synchronize the pulley to appear as stationary.

15. The system of claim 1, the video device comprising a camera having a field of view that substantially includes the pulley.

* * * * *